United States Patent
Wu

(10) Patent No.: US 9,984,656 B2
(45) Date of Patent: May 29, 2018

(54) SIGNAL CONVERTING METHODS

(71) Applicant: Shenzhen China Star Optoelectronics Technology Co., Ltd., Shenzhen, Guangdong (CN)

(72) Inventor: Jinjun Wu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 132 days.

(21) Appl. No.: 14/908,666

(22) PCT Filed: Jan. 5, 2016

(86) PCT No.: PCT/CN2016/070145
§ 371 (c)(1),
(2) Date: Jan. 29, 2016

(87) PCT Pub. No.: WO2017/096681
PCT Pub. Date: Jun. 15, 2017

(65) Prior Publication Data
US 2017/0256233 A1   Sep. 7, 2017

(51) Int. Cl.
*G09G 5/02*   (2006.01)

(52) U.S. Cl.
CPC ........... *G09G 5/02* (2013.01); *G09G 2340/06* (2013.01); *G09G 2370/12* (2013.01)

(58) Field of Classification Search
CPC ...... G09G 5/02; G09G 2370/12; G09G 5/363; G06T 11/001; G06T 2207/20021; G06T 5/00; G06T 5/002; G06T 11/60; G06T 13/40; G06T 15/205; G06T 15/80; G06T 7/90; G06F 3/04845; H04N 19/186
See application file for complete search history.

(56) References Cited

U.S. PATENT DOCUMENTS

| | | | |
|---|---|---|---|
| 2009/0160871 A1* | 6/2009 | Hsu | G09G 3/2003 345/589 |
| 2012/0133670 A1* | 5/2012 | Kim | G09G 5/02 345/593 |
| 2016/0335984 A1* | 11/2016 | Wu | G09G 5/02 |

FOREIGN PATENT DOCUMENTS

| | | |
|---|---|---|
| CN | 102479482 A | 5/2012 |
| CN | 104103254 A | 10/2014 |
| CN | 104299599 A | 1/2015 |

* cited by examiner

Primary Examiner — Xilin Guo
(74) Attorney, Agent, or Firm — Andrew C. Cheng

(57) ABSTRACT

A signal converting method includes: receiving RGB signals; enhancing color of a red component, a green component, and a blue component of the RGB signals to convert the RGB signals into RGBY signals; and outputting the converted RGBY signals. The signal converting method may enhance the saturation of the red component, the green component, and the blue component of the RGBY signals, such that the components of each of the colors are more vivid and more balanced.

6 Claims, 3 Drawing Sheets

SIGNAL CONVERTING METHODS

BACKGROUND OF THE INVENTION

1. Field of the Invention

The present disclosure relates to display technology, and more particularly to a signal converting method for converting RGB signals into RGBY signals.

2. Discussion of the Related Art

Currently, pixels of conventional display devices, such as the liquid crystal display panel (LCD) and organic electroluminescent display panel (OLED), generally include sub-pixels having three RGB color components, i.e., the red component, green component, the blue component. With the evolution of display technology, the liquid crystal panel may be made by sub-pixels having RGBW components, i.e., the red component, green component, the blue component, and yellow component. Due to the yellow component, yellow and gold colors within the signals may be displayed with better performance. The color of skin, which usually occur in the images, may be more natural. A the same time, as the yellow component operates as complementary color for the blue component, the performance of the blue component may be enhanced.

Generally, RGB signals are transmitted by VGA interface or DVI interface. If the RGB signals are directly applied to the RGBY display panel, the image may be distorted. In addition, with respect to conventional RGBY display panel, only the color of yellow is more vivid when compared to other colors.

SUMMARY

The present disclosure relates to a signal converting method for converting RGB signals into RGBY signals, and the method may solve the issue of low saturation of the color of yellow.

In one aspect, a signal converting method includes: receiving RGB signals; enhancing color of a red component, a green component, and a blue component of the RGB signals to convert the RGB signals into RGBY signals; and outputting the converted RGBY signals.

Wherein the step of converting the RGB signals into the RGBY signals further includes: (A) detecting a red component value, a green component value, and a blue component value within the RGB signals of a respective pixel; (B) determining whether the blue component value is the minimum one among the red component value, the green component value, and the blue component value; (C) when the blue component value is not the minimum one, configuring the yellow component value within the RGBY signals to be zero, and enhancing the color of the red component, the green component, and the blue component of the RGB signals in view of a HSV color space to convert the RGB signals into the RGBY signals; (D) when the blue component value is the minimum one, converting the RGB signal into the RGBY signals in accordance with at least one predetermined rule; and wherein steps (A) through (D) are executed for each of the pixels.

Wherein the step (C) of enhancing the color of the red component, the green component, and the blue component of the RGB signals in view of a HSV color space further includes: (C1) converting the RGB signals into the HSV signals; (C2) stretching a saturation of the HSV signals; and (C3) converting the stretched HSV signals into the RGB signals.

Wherein the step of (C2) further includes stretching the saturation of the HSV signals via at least one sine function.

Wherein in step (C2), the sine function below is adopted to stretch the saturation of the HSV signals:

$$S' = K \cdot \sin\left(S \cdot \frac{P}{2}\right)$$

Wherein S' represents the stretched saturation, S represents the saturation before being stretched, K is a stretch factor, and P is pi.

Wherein the predetermined rules includes a first predetermined rule and a second predetermined rule, wherein the step (D) further includes: (D1) if the red component value is the minimum value, determining if the red component value is the maximum value among the red component value, the green component value, and the blue component value; (D2) if the red component value is the maximum value, converting the RGB signals into the RGBY signals in accordance with the first predetermined rule; and (D3) if the red component value is not the maximum value, converting the RGB signals into the RGBY signals in accordance with the second predetermined rule.

Wherein the first predetermined rule includes: configuring the yellow component value within the RGBY signals to be the green component value within the RGB signals, configuring the green component value within the RGBY signals to be zero, configuring the blue component value within the RGBY signals to be the blue component value within the RGB signals, and determining the red component value within the RGBY signals in accordance with the red component value within the RGB signals and the yellow component value within the RGBY signals.

Wherein the red component value within the RGBY signals is determined in accordance with the red component value within the RGB signals and the yellow component value within the RGBY signals by the equation:

$$R_0 = 255 \cdot \left[\left(\frac{R}{255}\right)^r - \left(\frac{Y}{255}\right)^r\right]^{1/r};$$

Wherein $R_0$ represents the red component value within the RGBY signals, R represents the red component value within the RGB signals, Y represents the yellow component value within the RGBY signals, and r represents Gamma value.

Wherein the second predetermined rule includes: configuring the yellow component value within the RGBY signals to be the red component value within the RGB signals, configuring the red component value within the RGBY signals to be zero, configuring the blue component value within the RGBY signals to be the blue component value within the RGB signals, and determining the green component value within the RGBY signals in accordance with the green component value within the RGB signals and the yellow component value within the RGBY signals.

Wherein the green component value within the RGBY is determined in accordance with the green component value within the RGB signals and the yellow component value within the RGBY signals by the equation:

$$G_0 = 255 \cdot \left[\left(\frac{G}{255}\right)^r - \left(\frac{Y}{255}\right)^r\right]^{1/r}$$

Wherein $G_0$ represents the green component value within the RGBY signals, G represents the green component value within the RGB signals, Y represents the yellow component value within the RGBY signals, and r represents Gamma value.

According to the present disclosure, the signal converting method enhance the saturation of the red component, the green component, and the blue component of the RGBY signals, such that the components of each of the colors are more vivid and more balanced.

DETAILED DESCRIPTION OF THE EMBODIMENTS

Figure 1:
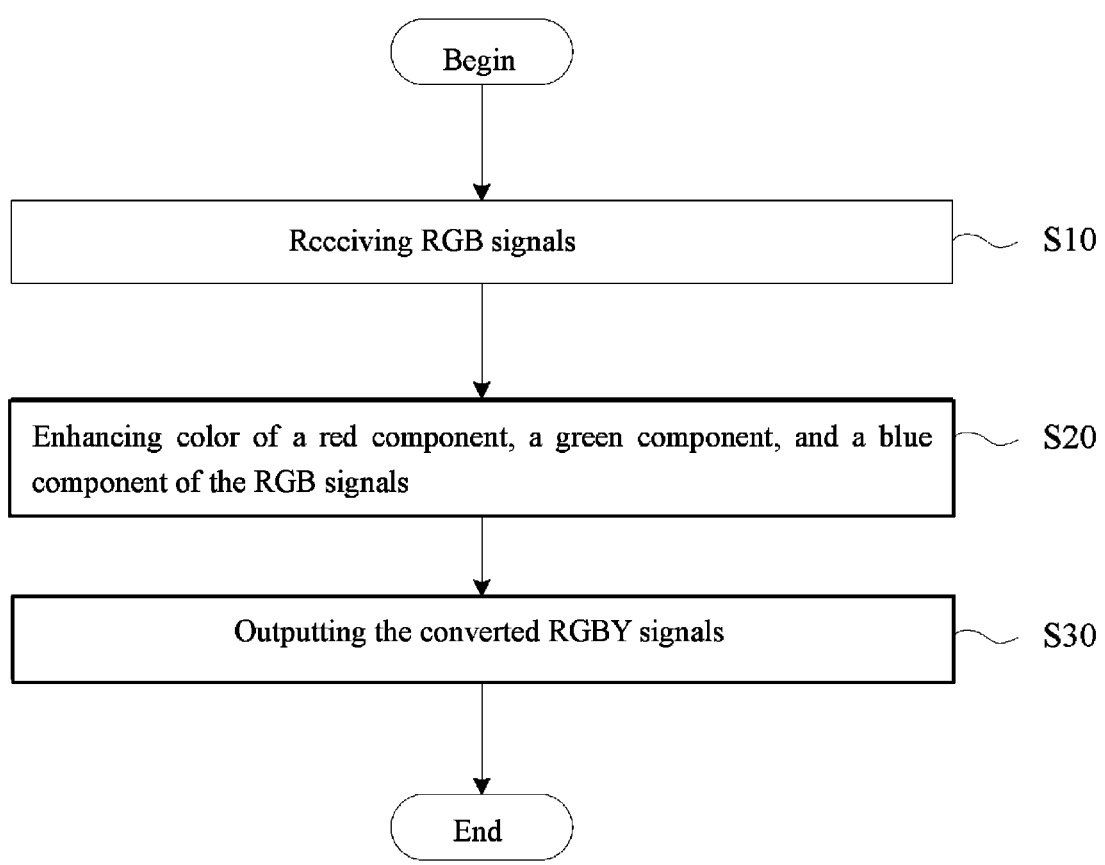
FIG. 1 is a flowchart of the signal converting method in accordance with one embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

In the present disclosure, a signal converting method is proposed to covert the RGB signals into the RGBY signals such that the RGB signals transmitted by the signal transmission interfaces, such as the VGA interfaces and DVI interfaces, may apply to the RGBY display panel. In addition, during the signal converting process, the colors other than yellow are enhanced such that the saturation of the colors other than yellow may be enhanced.

FIG. 1 is a flowchart of the signal converting method in accordance with one embodiment.

In FIG. 1, in step S10, receiving RGB signals.

In step S20, enhancing the color by a red component, a green component, and a blue component of the RGB signals to convert the RGB signals to the RGBY signals.

According to the present disclosure, the signal converting method enhance the saturation of the red component, the green component, and the blue component of the RGBY signals, such that the components of each of the colors are more vivid and more balanced.

In step S30, outputting the converted RGBY signals.

The step of enhancing the red component, the green component, and the blue component within the RGB signals of FIG. 1, i.e., step S20, will be described in detail by referring to FIG. 2.

Figure 2:
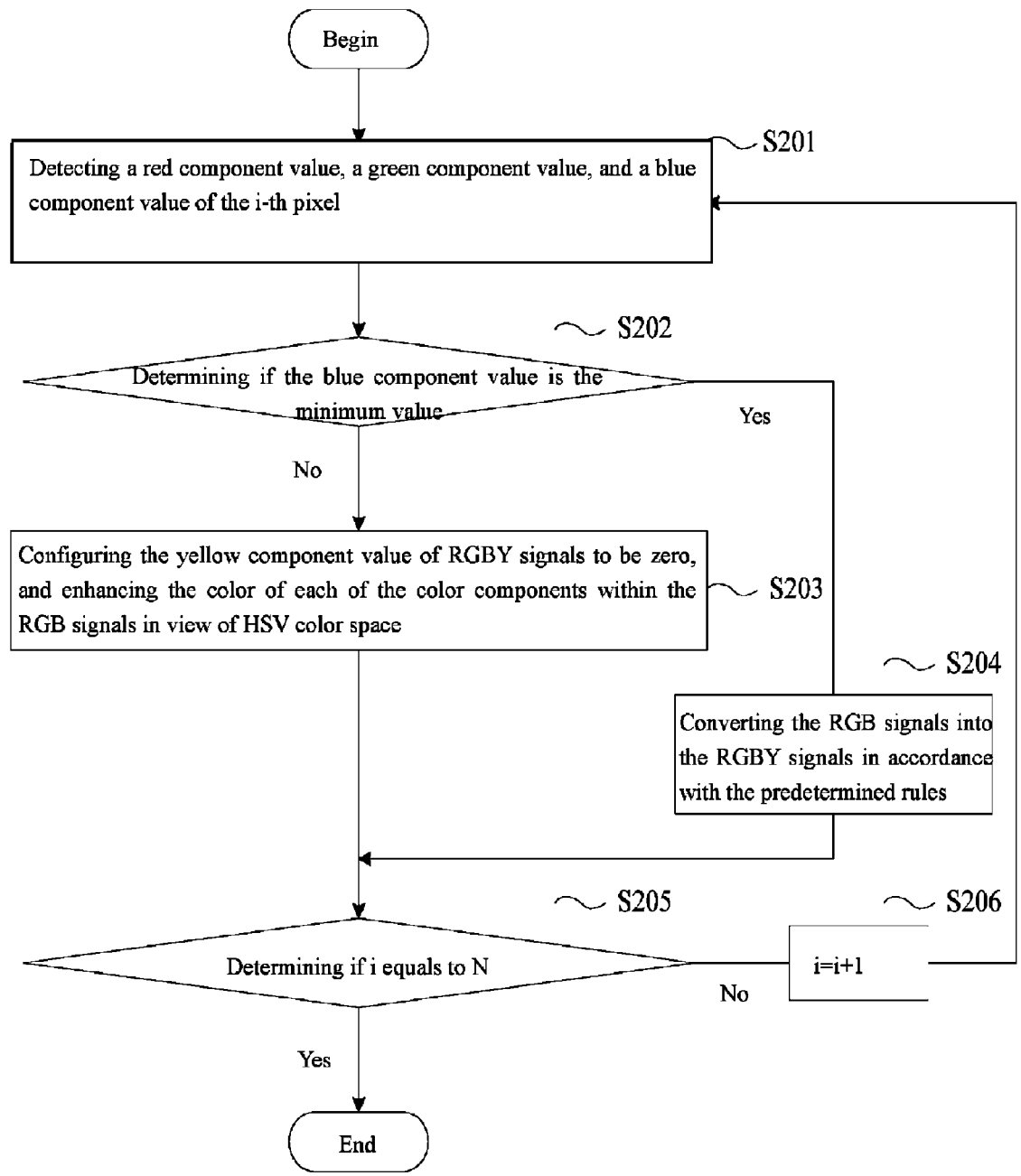
FIG. 2 is a flowchart illustrating the step of converting the RGB signals into the RGBY signals in FIG. 1.

FIG. 2 is a flowchart illustrating the step of converting the RGB signals into the RGBY signals in FIG. 1.

Referring to FIG. 2, in step S201, detecting a red component value, a green component value, and a blue component value of the RGB signals of the i-th pixel. It can be understood that, in step S201, the grayscale values of the red component, the green component, and the blue component of the RGB signals are detected. The grayscale values of each of the components may be detected by conventional methods, and thus is omitted hereinafter.

In step S202, determining whether the blue component value is the minimum value among the red component value, the green component value, and the blue component value. Specifically, determining whether the grayscale value of the blue component is the minimum value among the grayscale values of the red component, the green component, and the blue component.

If the grayscale value of the blue component is not the minimum value among the grayscale values of the red component, the green component, and the blue component, the process goes to step S203. In step S203, the yellow component value of the RGBY signals is configured to be zero. The colors of the red component, the green component, and the blue component within the RGB signals are enhanced in view of the HSV color space so as to convert the RGB signals into the RGBY signals. When the blue component value is not the minimum one, the color displayed by the RGB signals is not yellow. Under the circumstance, in order to keep the color from drifting, the yellow component value of the RGBY signals is configured to be zero. Afterward, the colors of the components other than yellow (that is, the red component, the green component, and the blue component) are enhanced.

The step of enhancing the red component, the green component, and the blue component within the RGB signals of FIG. 2, i.e., step S203, in view of the HSV color space will be described in detail by referring to FIG. 3.

Figure 3:
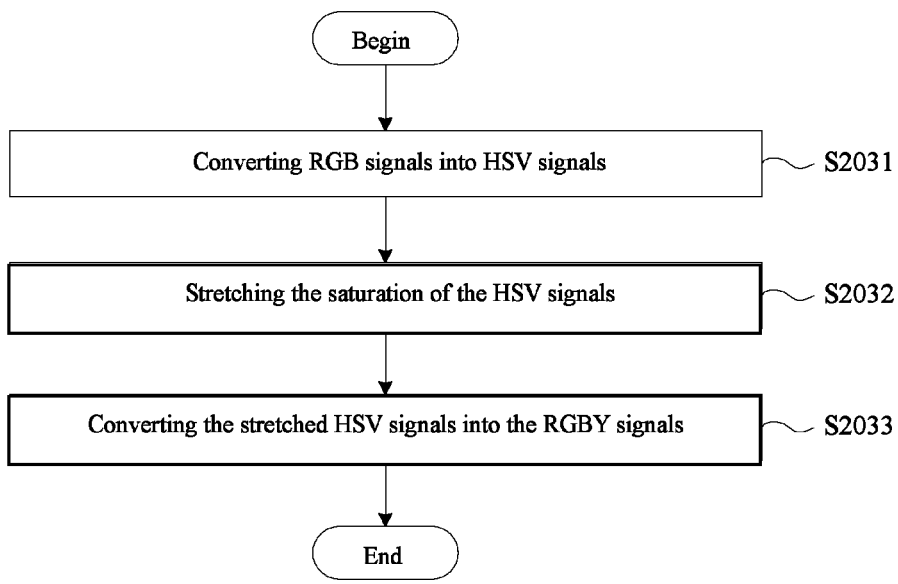
FIG. 3 is a flowchart illustrating a color enhancing step of the red component, the green component, and the blue component of the RGB signals in view of HSV color space of FIG. 2.

FIG. 3 is a flowchart illustrating a color enhancing step of the red component, the green component, and the blue component of the RGB signals in view of HSV color space of FIG. 2.

Referring to FIG. 3, in step S2031, converting the RGB signals into the HSV signals. Here, the RGB signals may be converted into the HSV signals by any one of conventional methods.

In an example, the process of converting the RGB signals into the HSV signals is described as below.

max=max(R, G, B). Determining a maximum value among the red component value, the green component value, and the blue component value within the RGB signals.

min=min(R, G, B), Determining a minimum value among the red component value, the green component value, and the blue component value within the RGB signals.

If R=max, H=(G−B)/(max−min); if the red component value is the maximum one, the color (H) within the HSV signals may be determined by the expression:

(G−B)/(max−min);

if G=max, H=2+(B−R)/(max−min); if the green component value is the maximum one, the color (H) within the HSV signals may be determined by the expression:

2+(B−R)/(max−min);

if B=max, H=4+(R−G)/(max−min); if the blue component value is the maximum one, the color (H) within the HSV signals may be determined by the expression:

4+(R−G)/(max−min);

H=H*60; the color (H) within the HSV signals is multiplied by 60, and the value of the color (H) is determined.

if H<0, H=H+360; if the value of the color (H) within the HSV signals is smaller than zero, the value of the color (H) within the HSV signals is added by 360, and the value of the color (H) is determined.

V=max(R, G, B); the lightness (V) within the HSV signals equals to the maximum value among the red component value, the green component value, and the blue component value.

S=(max−min)/max=1−min/max; the saturation (S) within the HSV signals is determined by the expression: 1−min/max;

The above method of converting the RGB signals into the HSV signals is only one example, and thus the present disclosure is not limited thereto. Other methods may be adopted to converting the RGB signals into the HSV signals.

In step S2032, the saturation within the HSV signals is stretched. Alternatively, the saturation within the HSV signals may be stretched by sine function.

For instance, the saturation within the HSV signals may be stretched by sine function:

$$S' = K \cdot \sin\left(S \cdot \frac{P}{2}\right) \quad (1)$$

Wherein S' represents the stretched saturation, S represents the saturation before being stretched, K is a stretch factor, and P is pi. The stretch factor (K) may be selected from the range [0, 1]. When K=0, the saturation is the lowest one, and the black/white image is displayed.

In step S2033, the HSV signals having the stretched saturation are converted into the RGB signals. Here, the HSV signals may be converted into the RGB signals by any one of conventional methods.

In one example, the process of converting the HSV signals into the RGB signals is described hereinafter:

if S'=0, the stretched saturation (S') equals to zero.

R=G=B=V; when the stretched saturation (S') equals to zero, the red component value, the green component value, and the blue component value within the RGB signals equal to the value of the lightness (V) within the HSV signals;

else, the stretched saturation (S') is not zero.

H/=60; the value of the color (H) within the HSV signals is divided by 60 and the value of the color (H) is determined.

i=INTEGER(H); the value of the color (H) is rounded. Here, the fractional part of the color (H) is omitted to round the value of the color (H).

f=H−i; f equals to a difference value between the value of the color (H) an the integral part of the value of the color (H).

a=V*(1−s);
b=V*(1−s*f);
c=V*(1−s*(1−f));

switch(i); the corresponding red component value, the green component value, and the blue component value within the RGBY signals may be determined in accordance with the integral part of the value of the color (H).

case 0: R=V; G=c; B=a; When i equals to zero, the red component value within the RGB signals equals to the lightness (V) within the HSV signals, the green component value equals to c, and the blue component value equals to a.

case 1: R=b; G=V; B=a; When i equals to one, the red component value within the RGB signals equals to b, the green component value equals to the lightness (V) within the HSV signals, and the blue component value equals to a.

case 2: R=a; G=V; B=c; When i equals to two, the red component value within the RGB signals equals to a, the green component value equals to the lightness (V) within the HSV signals, and the blue component value equals to c.

case 3: R=a; G=b; B=V; When i equals to three, the red component value within the RGB signals equals to a, the green component value equals to b, and the blue component value equals to the lightness (V) within the HSV signals.

case 4: R=c; G=a; B=V; When i equals to four, the red component value within the RGB signals equals to c, the green component value equals to a, and the blue component value equals to the lightness (V) within the HSV signals.

case 5: R=V; G=a; B=b; When i equals to five, the red component value within the RGB signals equals to the lightness (V) within the HSV signals, the green component value equals to a, and the blue component value equals to b.

In the above example, the HSV signals are converted into the RGB signals, but the present disclosure is not limited thereto. The HSV signals may be converted into the RGB signals by any one of conventional methods.

Referring to FIG. 2, if the grayscale value of the blue component is the minimum value among the grayscale values of the red component, the green component, and the blue component, the process goes to step S204. In step S204, the RGB signals are converted into the RGBY signals in accordance with predetermined rules. When the blue component value is the minimum one, the color displayed by the RGB signals is yellow. At this moment, the RGB signals are converted in accordance with predetermined rules.

The step of converting the RGB signals into the RGBY signals in accordance with the predetermined rules of FIG. 2, i.e., step S204, will be described in detail by referring to FIG. 4.

Figure 4:
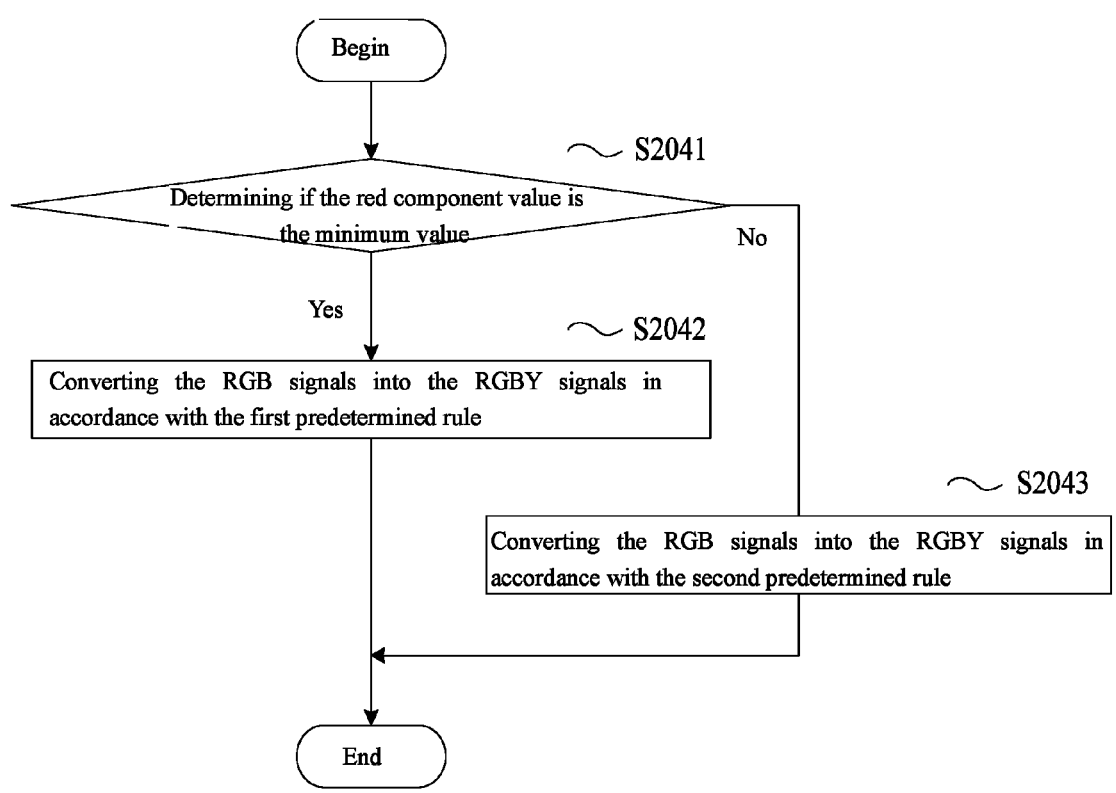
FIG. 4 is a flowchart illustrating the step of converting the RGB signals into the RGBY signals in accordance with a predetermined rule of FIG. 2.

FIG. 4 is a flowchart illustrating the step of converting the RGB signals into the RGBY signals in accordance with a predetermined rule of FIG. 2.

Referring to FIG. 4, in step S2041, determining whether the red component value is the minimum value among the red component value, the green component value, and the blue component value. Specifically, determining whether the grayscale value of the red component is the minimum value among the grayscale values of the red component, the green component, and the blue component.

If the grayscale value of the red component is not the maximum value among the grayscale values of the red component, the green component, and the blue component, the process goes to step S2042. In step S2042, the RGB signals are converted into the RGBY signals in accordance with a first predetermined rule.

Preferably, the first predetermined rule may include: configuring the yellow component value within the RGBY signals to be the green component value within the RGB signals, configuring the green component value within the RGBY signals to be zero, configuring the blue component value within the RGBY signals to be the blue component value within the RGB signals, and determining the red component value within the RGBY signals in accordance with the red component value within the RGB signals and the yellow component value within the RGBY signals.

In an example, the red component value within the RGBY may be determined in accordance with the red component value within the RGB signals and the yellow component value within the RGBY signals by the equation below:

$$R_0 = 255 \cdot \left[\left(\frac{R}{255}\right)^r - \left(\frac{Y}{255}\right)^r\right]^{1/r} \quad (2)$$

Wherein $R_0$ represents the red component value within the RGBY signals, R represents the red component value within the RGB signals, Y represents the yellow component value within the RGBY signals, and r represents Gamma value.

If the red component value is not the maximum value among the red component value, the green component value, and the blue component value, the process goes to step S2043. In step S2043, the RGB signals are converted into the RGBY signals in accordance with a second predetermined rule. At this moment, the green component value is the maximum one among the detected red component value, the green component value, and the blue component value.

Preferably, the second predetermined rule may include: configuring the yellow component value within the RGBY signals to be the red component value within the RGB signals, configuring the red component value within the RGBY signals to be zero, configuring the blue component value within the RGBY signals to be the blue component value within the RGB signals, and determining the green component value within the RGBY signals in accordance with the green component value within the RGB signals and the yellow component value within the RGBY signals.

In an example, the green component value within the RGBY may be determined in accordance with the green component value within the RGB signals and the yellow component value within the RGBY signals by the equation below:

$$G_0 = 255 \cdot \left[\left(\frac{G}{255}\right)^r - \left(\frac{Y}{255}\right)^r\right]^{1/r} \quad (3)$$

Wherein $G_0$ represents the green component value within the RGBY signals, G represents the green component value within the RGB signals, Y represents the yellow component value within the RGBY signals, and r represents Gamma value.

Referring to FIG. 2, in step S205, determining whether i equals to N. Here, $1 \leq i \leq N$, N represents the number of pixels contained in the RGBY display panel, and N is an natural number larger than zero.

If i is not equal to N, the process goes to step S206, such that i=i+1 and the process goes back to step S201.

If i equals to N, the RGB signals of all of the pixels contained in the RGBY display panel are converted into the RGBY signals.

According to the present disclosure, the signal converting method enhance the saturation of the red component, the green component, and the blue component of the RGBY signals, such that the components of each of the colors are more vivid and more balanced.

It can be understood that the signal converting method may be accomplished by machine codes stored in computer readable mediums. Persons skilled in the art can implement the above method in view of the above disclosure. As the program is executed, the processes of the embodiments in the aforesaid respective methods can be included.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A signal converting method, comprising:
receiving RGB signals;
enhancing color of a red component, a green component, and a blue component of the RGB signals to convert the RGB signals into RGBY signals, the step of converting the RGB signals into the RGBY signals further comprises:
(A) detecting a red component value, a green component value, and a blue component value within the RGB signals of a respective pixel;
(B) determining whether the blue component value is the minimum one among the red component value, the green component value, and the blue component value;
(C) when the blue component value is not the minimum one, configuring the yellow component value within the RGBY signals to be zero, and enhancing the color of the red component, the green component, and the blue component of the RGB signals in view of a HSV color space to convert the RGB signals into the RGBY signals;
(D) when the blue component value is the minimum one, converting the RGB signal into the RGBY signals in accordance with at least one predetermined rule, the predetermined rules comprise a first predetermined rule and a second predetermined rule, wherein the step (D) further comprises:
(D1) if the red component value is the minimum value, determining if the red component value is the maximum value among the red component value, the green component value, and the blue component value;
(D2) if the red component value is the maximum value, converting the RGB signals into the RGBY signals in accordance with the first predetermined rule; and
(D3) if the red component value is not the maximum value, converting the RGB signals into the RGBY signals in accordance with the second predetermined rule; and
wherein steps (A) through (D) are executed for each of the pixels;
outputting the converted RGBY signals;
wherein the first predetermined rule comprises:
configuring the yellow component value within the RGBY signals to be the green component value within the RGB signals, configuring the green component value within the RGBY signals to be zero, configuring the blue component value within the RGBY signals to be the blue component value within the RGB signals, and determining the red component value within the RGBY signals in accordance with the red component value within the RGB signals and the yellow component value within the RGBY signals;
wherein the red component value within the RGBY signals is determined in accordance with the red component value within the RGB signals and the yellow component value within the RGBY signals by the equation:

$$R_0 = 255 \cdot \left[\left(\frac{R}{255}\right)^r - \left(\frac{Y}{255}\right)^r\right]^{1/r};$$

wherein $R_0$ represents the red component value within the RGBY signals, R represents the red component value within the RGB signals, Y represents the yellow component value within the RGBY signals, and r represents Gamma value.

2. The signal converting method as claimed in claim 1, wherein the step (C) of enhancing the color of the red component, the green component, and the blue component of the RGB signals in view of a HSV color space further comprises:
(C1) converting the RGB signals into the HSV signals;
(C2) stretching a saturation of the HSV signals; and
(C3) converting the stretched HSV signals into the RGB signals.

3. The signal converting method as claimed in claim 2, wherein the step of (C2) further comprises stretching the saturation of the HSV signals via at least one sine function.

4. The signal converting method as claimed in claim 3, wherein in step (C2), the sine function below is adopted to stretch the saturation of the HSV signals:

$$S' = K \cdot \sin\left(S \cdot \frac{P}{2}\right)$$

wherein S' represents the stretched saturation, S represents the saturation before being stretched, K is a stretch factor, and P is pi.

5. The signal converting method as claimed in claim 1, wherein the second predetermined rule comprises: configuring the yellow component value within the RGBY signals to be the red component value within the RGB signals, configuring the red component value within the RGBY signals to be zero, configuring the blue component value within the RGBY signals to be the blue component value within the RGB signals, and determining the green component value within the RGBY signals in accordance with the green component value within the RGB signals and the yellow component value within the RGBY signals.

6. The signal converting method as claimed in claim 5, wherein the green component value within the RGBY is determined in accordance with the green component value within the RGB signals and the yellow component value within the RGBY signals by the equation:

$$G_0 = 255 \cdot \left[\left(\frac{G}{255}\right)^r - \left(\frac{Y}{255}\right)^r\right]^{1/r}$$

wherein $G_0$ represents the green component value within the RGBY signals, G represents the green component value within the RGB signals, Y represents the yellow component value within the RGBY signals, and r represents Gamma value.

* * * * *